United States Patent [19]

Hendrickson et al.

[11] 4,254,139
[45] Mar. 3, 1981

[54] LAUNDRY CONDITIONER DISPENSING ARTICLE

[75] Inventors: Thomas C. Hendrickson, South River; Marvin Liebowitz, Edison, both of N.J.

[73] Assignee: Colgate-Palmolive Company, New York, N.Y.

[21] Appl. No.: 105,807

[22] Filed: Dec. 20, 1979

[51] Int. Cl.³ .................... B32B 3/06; B32B 5/16; B32B 5/18; B32B 5/30
[52] U.S. Cl. ........................................ 428/283; 34/60; 427/242; 428/290; 428/311; 428/315; 428/328; 428/900; 428/905
[58] Field of Search ............... 428/310, 311, 315, 328, 428/329, 900, 905, 283, 290; 427/242; 34/60

[56] References Cited

U.S. PATENT DOCUMENTS

| 3,267,701 | 8/1966 | Mandarino | 427/242 |
|---|---|---|---|
| 3,616,145 | 10/1971 | Clifton | 428/900 |
| 3,698,095 | 10/1972 | Grand et al. | 34/60 |
| 3,947,971 | 4/1976 | Bauer | 34/60 |
| 4,004,685 | 1/1977 | Mizuno et al. | 427/242 |
| 4,012,540 | 3/1977 | McQueary | 427/242 |
| 4,057,673 | 11/1977 | Falwene | 428/315 |
| 4,105,813 | 8/1978 | Mizuno | 428/310 |
| 4,137,361 | 1/1979 | Deffeyes et al. | 428/328 |

Primary Examiner—William J. Van Balen
Attorney, Agent, or Firm—Norman Blumenkopf; Herbert S. Sylvester; Murray M. Grill

[57] ABSTRACT

Reusable article of unitary construction for dispensing conditioner for fibrous materials in an automatic laundry dryer and/or washer or similar container for fibrous materials, comprising a first layer of magnetized, substantially form retaining sheet material such as soft rubber, adapted to forcibly, magnetically engage an inner metal surface of said dryer and/or washer in form-retaining relationship therewith and secured thereto in overlying relationship a second layer of sorptive material, e.g., foam plastic, natural or synthetic sponge for receiving the conditioner.

10 Claims, 3 Drawing Figures

LAUNDRY CONDITIONER DISPENSING ARTICLE

FIELD OF THE INVENTION

The invention relates in general to a conditioner dispensing article of unitary construction beneficially adapted for repetitive use in an automatic laundry washer, dryer and other similar container of the rotatable drum type and in particular to such an article wherein means for attachment thereof to an inner metal surface of said container is self-executing thus obviating any necessity for the use of external attachment means.

BACKGROUND OF THE INVENTION

Discussion of the Prior Art

In the laundering of fabric materials such as wool, silk, cotton, synthetics, etc. it is conventional to add one or more conditioning agents at some point in the process in order to impart or enhance softness, antistatic properties, resistance to bacteria and the like and to reduce such untoward effects as tangling, wrinkling, knotting etc. Conditioning agents for such uses are well known. Generally, the agent is added to the last rinse of the wash cycle. However, certain inherent disadvantages have spurred attempts to make feasible the addition of such agents at some point in the laundering process other than the wash cycle. Thus, the presence together in the wash or rinse medium of anionic detergent and cationic material often leads to the formation of unsightly, insoluble precipitates and consequent fabric staining. This tendency severely limits the use of cationic softener. Addition thereof is necessarily delayed until some point in the laundering process wherein anionic is at least substantially depleted. Often, the user is required to attend at least the wash-rinse cycle of the operation in order to add the conditioner at the correct interval. By effecting such treatments in the dryer the foregoing disadvantages are effectively overcome. Moreover, there is no necessity for the conditioning agent to be substantive to the fabrics and to adhere to them strongly in preference to the solvent of the dilute solutions of the wash and rinse cycles.

Uniform distribution of the conditioning agent in the dryer whereby to achieve effective contact thereof with the washed fabrics, i.e. fibrous materials in a manner convenient to the user is not, however, easily attained. Thus, the use of liquid softener sprays for direction onto the fabrics or, by pretreatment, onto the internal walls of the dryer can be costly. Moreover, the risk of spotting, staining, etc. due to local applications of excess conditioning agent may be significant. The use of conditioning articles, generally comprising a base or substrate, which may be form-retaining or flexible, coated and/or impregnated with conditioner provides improvement. In use, the conditioner is removable to the fabrics by the staining may be severe; for example those stains developed due to the contacting of cationic conditioning agents, e.g. quaternary ammonium salts, with materials containing color bodies or heavy metal ions such as ferrous or ferric ion may be removable, if at all, only by dry cleaning.

The use of form-retaining as opposed to flexible bases to avoid the problems associated with the structural deformations of flexible bases likewise presents problems. Although not difficult to locate by the user, as is the case with flexible conditioning articles, they must nevertheless be removed upon completion of the treatment cycle. Furthermore, they must be of a certain density to prevent them from riding atop the laundry load and thus effectively contacting but a portion of the fabric being treated. Prior art relevant to the foregoing discussion include the following U.S. Pat. Nos. 3,442,692; 3,632,396; 3,633,538; 3,650,816; 3,676,199; 3,686,025; 3,696,034; 3,698,095; 3,826,682; 3,843,395; 3,895,128; 3,944,494; 3,945,936; 3,947,971; 3,956,556 and 4,098,937.

To overcome the foregoing, conditioner articles have been proposed equipped with means for their temporary attachment to an inner wall portion of the degree or washer. In general, the attaching means include clips, hook and loop assemblies, e.g. that available commercially as Velco fastener, and a variety of other mechanical means. U.S. Pat. No. 3,634,947 describes a conditioner article comprising a base of thin flexible material such as paper or plastic coated in a first side, i.e. major surface with a conditioning agent, waxy in nature, and preferably a fabric softener or antistatic agent, and on the opposite side with a pressure sensitive adhesive. The latter enables attachment of the article to the internal wall portion of the dryer apparatus in form-retaining relationship therewith. Expedients of this type avoid to a great extent the problems encountered with articles adapted for commingling with the fabrics. The use of adhesive attachment means involves the risk that bonding strength may be undermined by virture of the high humidity-high temperature conditions extant in the dryer or washed apparatus. Softening of the adhesive may well occur leading to stripping of the article from the wall portion and particularly under the high impact conditions characterizing article-fabric contacting. The article thus becomes commingled with the fabrics. The use of hook and loop means is similarly disadvantaged since attachment thereof to the wall portion is invariably by adhesive means. To the extent that buckling, slippage, etc. of the adhesively attached element occurs, form retaining relationship of the element with the wall portion is not maintained. Such articles are somewhat inconvenient to manipulate since the user must first remove a stripping layer protecting the adhesive. As will be appreciated, the handling of a ncessarily high-tack adhesive under laundering conditions can be extremely difficult. Other methods involving some structural modification of the dryer apparatus in order to fixedly engage the conditioner article thereto can be economically prohibitive.

A primary object of the invention is to provide a fabric conditioner article wherein the foregoing and related disadvantages are eliminated or at least mitigated to a substantial extent.

Another object of the invention is to provide such an article wherein any necessity for the use of external means whatever and as typified by adhesive, clips, hook-loop fastener elements and the like to enable attachment of said article, to an internal wall portion of a rotable drum washer, dryer or equivalent container means for fabrics is eliminated.

Yet another object of the invention is to provide such an article which may be readily and simply recharged with conditioner by the user upon exhaustion of the prior supply enabling effective repetitive use of such article.

Still another object of the invention is to provide such an article capable of being attached to an internal wall portion of the dryer, washer or equivalent apparatus by simple hand placement thereof to achieve a stable union of mating surfaces by simple contact thereof, said union being substantially immune to the temperature, humidity, solvent, etc. conditions prevailing in said apparatus.

A further object of the invention is to provide such an article wherein the disadvantages normally associated with conditioning articles designed for commingling with the fabrics being treated such as flaking off of conditions, entrapment of the article, and the like are eliminated.

A still further object of the invention is to provide an apparatus for conditioning fabrics compressing an automatic laundry dryer drum or similar container for laundering fabrics incorporating the conditioner article herein.

Other objects and advantages of the invention will become apparent hereinafter as the description proceeds.

The foregoing and related objects are attained in accordance with the invention which in its broader aspects provides a unitary conditioner article for dispensing conditioning agent in an automatic laundry dryer drum or similar apparatus for containing fabric to be treated, comprising a first layer consisting of a magnetized rubbery polymeric material adapted to forcibly, magnetically engage an internal metal surface of said apparatus in form retaining relationship and therewith a second layer integral with and overlying said first layer comprising a liquid permeable sorptive sheet material for containing and dispensing said conditioning agent.

In a further aspect, the invention provides an apparatus for conditioning fabrics comprising an automatic laundry dryer drum or similar container for fabric materials, means for rotating the drum and tumbling fabric materials contained therein and wherein an internal metallic surface portion of said drum has magnetically attached thereto the aforedescribed conditioner article.

The invention is described by reference to the accompanying drawing wherein like reference numerals designate similar parts throughout the several views and wherein:

DETAILED DESCRIPTION

Figure 1:
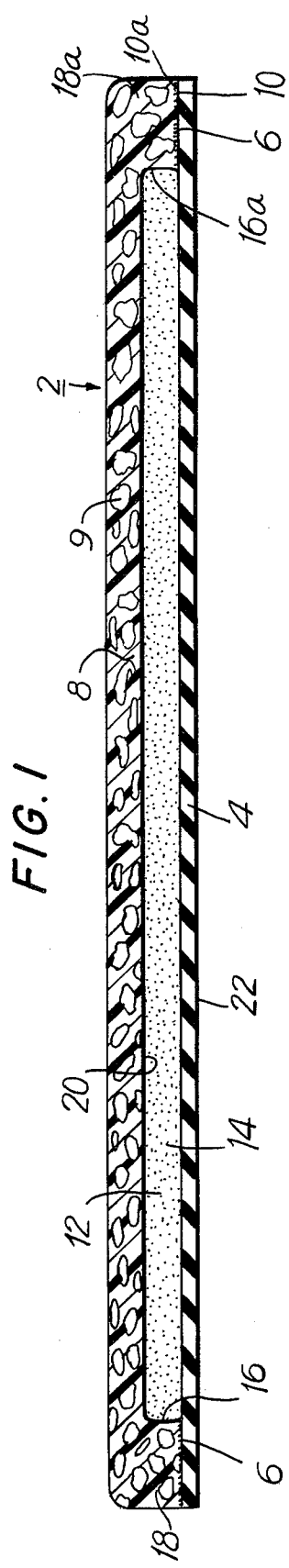
FIG. 1 is a vertical sectional view of a conditioning article in accordance with an embodiment of the invention.

In FIG. 1, a conditioner article in accordance with the invention and generally designated 2 comprises a base sheet 4 of magnetized rubbery polymer (soft rubber) joined by adhesive 6 (e.g. pressure sensitive, hot melt, etc. to a sorptive porous top sheet 8 having pores 9, e.g. polyurethane foam of the closed cell or open, intercommunicating cell type. Rubbery polymer layer 4 and outer layer 8 are bonded along their peripheral mating surface portions 10 and 10a respectively, to define a substantially centrally disposed free space volume 12, i.e. reservoir illustrated as containing conditioner 13. Reservoir 12 is bounded by internal sidewalls 16 and 16a of the downwardly extending peripheral portions 18 and 18a and inner surface 20 of top layer 8.

The generally inverted U-shaped configuration of top layer 8 is for purposes of more clearly defining reservoir 12 for receiving conditioner 14; the reservoir may alternatively be defined for example by a substantially planar sheet material, i.e. devoid of end portions 18 and 18a bonded to layer 4 as described and slightly oversized with reference thereto to allow accommodation of conditioner 14. Although effective with liquid conditioning agents, the embodiment of FIG. 1 is also useful for the containment and dispensing of solid or semi-solid conditioner materials which become molten under the temperatures prevailing in the dryer and in such form permeate porous outer layer 8.

In accordance with the invention, layer 4 comprises a rubbery, polymeric sheet material magnetized by the inclusion of magnetic material therein, e.g. a bar magnet or dispersed, magnetized particles. The latter may be substantially uniformly dispersed throughout layer 4 or in such manner as to provide a greater concentration thereof in the outer portions, i.e. in the immediate vicinity of outer surface 22 of layer 4. This insures a strong magnetic bond as between surface 22 and an inner metallic wall portion of the dryer, when mutually contacted, sufficient to hold conditioner article 2 in place throughout the fabric treatment and thereafter as desired. The rubbery polymeric material of layer 4 is preferably of the soft rubber type and thus sufficiently flexible or pliant to be conformed to and fit tightly against the mating surface portion of the dryer, i.e. in form retaining relationship therewith. These materials are well known in the art and preferably include natural rubbers and synthetic polymeric rubbers derived from homo-polymers and interpolymers of mono- and polyolefins, e.g. ethylene, propylene butadiene and the like. Hydrocarbon rubbers are ordinarily preferred being of an inert character. The rubber selected should, of course, be immune to the effects of the solvent medium present in the dryer at the temperature prevailing therein.

The material of outer layer 8 may be flexible or form retaining; in the latter case, the layers should be about the same as that of layer 4 to enable it to "follow" the contour conformation of layer 4 without risk of rupture of other form of structural breakdown. The material selected should be permeable to the fluidized form of conditioner 14 and be absorptive therefor. Suitable materials of the form retaining type are described for example in U.S. Pat. No. 3,634,947 and include, without necessary limitation, synthetic organic polymeric plastics preferably in foam form to provide porosity, e.g. the mentioned polyurethane polyvinyl chloride, polystyrene foamed polystyrene, either open or closed cell, glass reinforced polyester, etc., synthetic sponges, cellulose products including paperboard, cardboard, corrugated paperboard and the like.

Flexible materials useful for outer sorptive layer 8 are also described in U.S. Pat. No. 3,634,947 and include papers, plastics, rubbers, cloth sponges, fibers, felts and nonwoven fabrics. The fibrous materials may be natural or synthetic. Resilient foamed plastics of the polyurethane type are particularly useful.

The thickness of magnetized layer 4 and sorptive layer 8 may vary within the range of from about 0.001 to 10 cm. Generally, rubbery layer 4 varies within the higher portion of the range stated and is usually from about 0.1 to 10 cm. in thickness. The thickness of layer 8 depends for example, upon its sorptive capacity and permeability, i.e. in general the lower the permeability, the less the thickness. Thus, the thickness of layer 8 may be quite small or conversely, if highly porous as illustrated, at least equal in thickness to rubbery layer 4, as depicted in FIG. 1.

Figure 2:
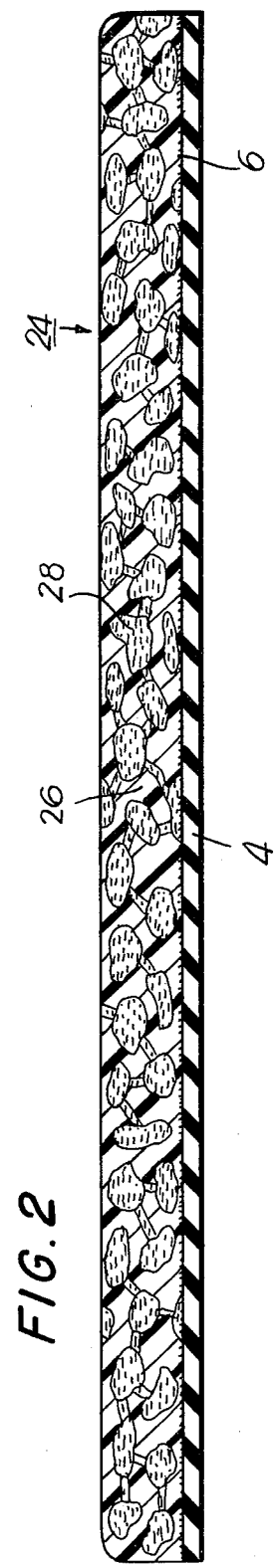
FIG. 2 is a vertical sectional view of a conditioning article in accordance with another embodiment of the invention; and, FIG. 3 is a vertical sectional view of a conditioning article in accordance with yet another embodiment of the invention.

In the embodiment illustrated in FIG. 2, a conditioner article, generally designated 24, comprises a magnetized rubbery base layer or sheet 4 and an outer continuous, reticulated sponge layer 26, having pores 28, adhesively by means 6 bonded thereto. This embodiment is useful with solid, semi-solid as well as liquid conditioning agent. Sponge layer 26 may be substantially form-retaining or flexible provided that the impact forces incident thereupon when in place in the dryer, due to contact with the tumbling fabrics, suffice to force the conditioner outwardly of sponge layer 26 and into contact with the fabrics. Particulate forms of solid or semi-solid conditioner are effectively used in this embodiment and can be added to layer 26 in molten liquid or solvent solution form e.g. by spraying, pouring, dropping, etc. whereby to substantially impregnate the layer, and allowed to dry to solid or semi-solid form. Under dryer temperature conditions, the conditioner melts and in such form is released from layer 26. Alternatively, solid or semi-solid conditioner can be grated, e.g. by rubbing and in such form become trapped within pores 28 of layer 26. The sponge material may be natural or synthetic, the latter type affording more control over flexibility.

Figure 3:
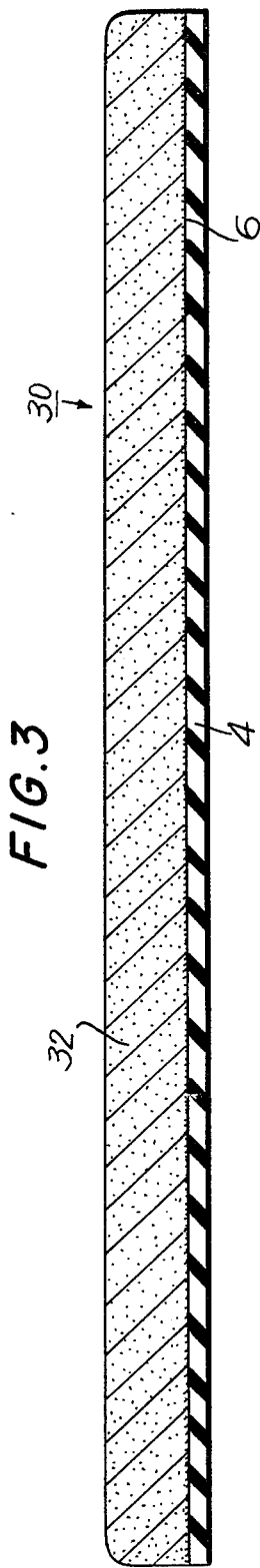

The embodiment of FIG. 3 illustrates a conditioner article generally designated 30 comprising a sorptive, liquid permeable, continuous layer 32, having an extremely fine pore size and rubbery, magnetized base 4.

This embodiment is particularly useful with liquid conditioners although solid and semi-solid types may be incorporated therein as described in connection with FIG. 2. Layer 32 can be fabricated from the materials previously described, e.g. paper, plastic, etc., the essential criteria being that the material selected have an absorptive nature and be permeable to liquid forms of the conditioner impregnating same. An adhesive 6 is also used here for bonding the layers.

The thickness of the layers in the FIG. 2 and FIG. 3 embodiments may vary as described in connection with FIG. 1. The outer sorptive layer of FIGS. 2 and 3 are usually controlled as to thickness and sorptive capacity so as to contain, upon substantial impregnation thereof, conditioner amounts approximately equal to those required for the conditioning treatment of a single batch of laundry. Amounts in significant excess thereof are generally not recommended in order to avoid the possibility of staining due to excess quantity of conditioner. Moreover, since conditioner may be expensive, it is imperative that waste be minimized. Relatively thin sorptive layers additionally assure dispensing of most of the conditioner during the early part of the drying cycle which is ordinarily preferred.

According to another embodiment of the invention and particularly applicable to the embodiments of FIGS. 2 and 3, outer layers 26 and 32 respectively may have applied thereto a magnetized rubbery layer similar to layer 4 but having a discontinuous surface to permit containment/dispensing of the conditioner. By discontinuous is meant that such layer is perforate according to any desired design whereby to expose the contained conditioner to the effects of the laundering medium, be it in the washer, dryer and other similar apparatus.

The use of an absorbent (sorptive) material for containing and dispensing conditioner in accordance with the invention is essential. The term "absorbent" or "sorptive" as used herein is intended to connote materials of the type described, capable of taking up and retaining up to about 50 times preferably from about 5 to 25 times, and more preferably from about 5 to 15 times its weight of water. In accordance with particularly preferred practice, the sorptive material should be capable of taking up and retaining at least about 3 times it weight of water. Determination of sorptive capacity can, for example, be in accordance with the procedure given in U.S. Pat. No. 3,843,395 which modifies the capacity testing procedures described in U.S. Specification UU-T-595b. Pore size may range from exceedingly fine (FIG. 3) to relatively large (FIGS. 1 and 2). In either case, it is required that the materials have a relatively high percentage of void volume or free space, i.e. at least about 40% and preferably 50% up to about 90% of the total volume of the sorptive layer is free space. Materials having the larger pore size (FIGS. 1 and 2) are more effective for containing solid and semi-solid conditioner agents and particularly when applied to the layer in solid form as by merely rubbing the solid conditioner there against to "grate" the conditioner. The resultant particles become entrapped within the porous structure. Thus, according to the invention, permeation rather than coating of the sorptive layer is achieved.

In use, the conditioner article herein is merely hand-placed against an internal metallic wall portion of the dryer apparatus such as the rotatable drum, door, fin or baffle, etc. Although normally attached intermediate the baffles, it is often preferred to mount the conditioner article on the baffles or other raised portions of the interior of the drying drum. Generally, this will be on a leading edge so as to promote optimum contact with the fabrics being conditioned. In any event, experience will aid in selecting the most effective locations for article attachment.

Usually, the article as commercially supplied will contain the conditioner. If not, it may be added to the sorptive layer in the manner previously described, e.g. by spraying, pouring, dropping, rubbing etc. The dryer, after loading with washed fabric is activated causing relative movement between the conditioner article and laundry. The combination of heat, moisture and impact contact between article and laundry effect the release of conditioner through the sorptive layer onto the tumbling fabric. Although the conditioning treatment is preferably effectuated in the laundry dryer, other laundry tumbling apparatus such as the washing machine may be used. Moreover, heat and drying air may be omitted for part or all of the cycle. Ordinarily, there will be about 5 to 50 changes of drying gas in the dryer drum per minute and the gas temperature will be from about 10° to 90° C. preferably from 50° to 80° C. The drum rotates at about 20 to 100 and preferably 4 to 80 revolutions per minute. The laundry load usually averages from 4 to 12 pounds and will occupy from 10 to 70% of the effective drying volume of the dryer. Drying generally takes from 5 minutes to 2 hours and usually from 20 to 60 minutes. Synthetic fabrics such as nylon and polyester ordinarily require only 3 to 10 minutes while permanent press requires usually from 10 to 30 minutes.

The conditioner article, after use, may be left in place and re-charged when necessary with a selected amount of conditioner. prior to subsequent use in the manner described. Since the magnetically bonded article is strongly affixed to the internal wall portion there is little, if any, danger of unseating same as a result of the re-charging operation, even if such requires abrading contact of conditioner with the sorptive layer of the article. Alternatively, the article may be removed by hand with the exertion of but slight pulling force exerted substantially normally to the plane of the major surface of the sorptive layer. However, re-charging does not require removal of the article. The conditioner article, can of course, be relocated as desired in the washer, dryer, etc. as the case may be, at the sole option of the user. As a further option, a plurality of articles may be positioned within the apparatus to achieve diverse conditioning effects in a single operation.

Conditioning agents useful herein include fabric softeners and antistatic agents including nonionic surface active materials, e.g. higher fatty acid monolower alkanolamides, higher fatty acid dilower alkanolamides, block copolymers of ethylene oxide and propylene oxide having hydrophilic and lypophilic end groups, alkyl (preferably middle alkyl) phenol polylower alkylene oxide lower alkanols, polymers of lower alkylene glycols, poly alkylene glycol ethers of higher fatty alcohols and poly alkylene glycol esters of higher fatty acids. Among the anionic agents are the higher fatty acid products with water soluble bases, higher fatty alcohol sulfates, higher fatty acid monoglyceride sulfates, sarcosides and taurides and linear higher alkaryl sulfonates. Cationic compounds include the higher alkyl, dilower alkyl amines, dihigher alkyl, lower alkyl amines and quaternary compounds, especially quaternary ammonium salts, e.g. quaternary ammonium halides. "Lower" as used herein describes $C_1$-$C_6$ alkyl and preferably $C_2$-$C_3$. The term "higher" indicates $C_{10}$-$C_{20}$ and preferably $C_{12}$-$C_{18}$. Mixtures of nonionic conditioning agents with cationics or anionics of the types mentioned above may also be used and generally the proportions of components of such mixtures will be chosen so as to have the final product in liquid or solid or semi-solid form as desired satisfactorily removable by a combination of moisture, heat and impact contact with laundry in an automatic dryer.

Specific examples of surface active materials of the types described above are given in the test Synthetic Detergents by Schwartz, Perry and Berch, published in 1958 by Interscience Publishers, New York, see pages 25 to 143. Among the more preferred of these are:

Nonionic—nonylphenoxy polyethoxy ethanol, stearic monoethanolamide; stearic diethanolamide; block copolymers of ethylene oxide and propylene oxide (Pluronics);

Anionic—sodium soap of mixed coconut oil and tallow fatty acids; sodium stearate; potassium stearate; sodium laurate; tallow alcohols sulfate;

Cationic—dilauryl dimethyl quaternary ammonium chloride; hydrogenated tallow alkyl trimethyl ammonium bromide and benzethonium chloride.

Amphoteric—e.g. cocoamido betaines, and mixtures of the foregoing.

The above list is only illustrative of some of the compounds useful in accordance with the present invention. Conditioning agents of these types are well known in the art and others than those mentioned above may also be used satisfactorily.

In addition to the fabric softener and or antistatic and an unwrinkling agents which are the principal conditioning compounds, other components may also be present in these conditioning compositions for their adjuvant effects. Thus, other conditioning agents may be used, including those designed to treat the fabrics in other ways than in softening. For example, perfumes, brighteners, bactericides, solvents, thickening or hardening agents, stabilizers and other materials may be incorporated in the conditioning compositions. In some cases, small quantities of water may be present, especially when the components form hydrates. Solvents and dispersants may be used to assist in applying the conditioner compositions to the sorptive layer is being coated with the conditioning composition. The types and proportion of the various adjuvants used will be chosen to make them non-interfering with the operations of the conditioning compounds.

The following examples are given for purposes of illustration only and are not intended to limit the invention Parts are by weight unless otherwise indicated.

EXAMPLE 1

A mixture of (A) 65 parts of a 1:1 mixture of distearyl dimethyl ammonium chloride and cocoamide propyl betaine and (B) 35 parts of tallow monoethanolamid are mixed and melted together; then cast into a bar of 20 grams. The bar is placed centrally on a Plastiform rubber magnet sheet (leaving a peripheral edge). A sheet of 1:1 cotton:Dacron 117×50 threads/in. 5.5 oz/yds. is laid over the bar and rubber sheet and the cotton:Dacron sheet and rubber sheet are heat sealed to each around the edges. When this assembly ($2\frac{1}{2}''\times 4''$) is attached by the magnetic rubber sheet to a dryer wall it is found that the product is satisfactory for 40 dryer cycles and gives excellent softness and antistat qualities to clothes dried in those 40 treatments.

EXAMPLE 2

Example 1 is repeated using 20 g. in bar form the following:
(A) 80/20 dimethyl distearyl ammonium methyl sulfate/cocoamidopropyl betaine
(B) dimethyl distearyl ammonium chloride
Similar excellent results are obtained.

EXAMPLE 3

A $4''\times 4''\times \frac{5}{8}''$ cellulose sponge is adhesively secured around its edge to a $4''\times 4''$ Plastiform rubber magnet sheet. The sponge is then impregnated with 30 grams of a 6% aqueous solution of dimethyl distearyl ammonium. The composite is attached to a dryer wall and gives excellent softening of a 9 lb. load of laundry dried therein. After 1 cycle there is still a fair amount of softener in the sponge. The sponge assembly can be removed and reimpregnated as desired and necessary for repeated usage.

What is claimed is:

1. Unitary conditioner article for dispensing conditioning agent in an automatic laundry dryer drum or similar apparatus for containing fabric to be treated comprising a first layer consisting of a magnetized, rubber polymeric material adapted to forcibly, magnetically engage an internal metallic surface portion of said apparatus in form-retaining relationship therewith, and a second layer integral with and overlying said first layer comprising a liquid permeable, sorptive sheet material for containing and dispensing said conditioning agent.

2. An article according to claim 1 wherein said first and second layers are continuously joined along the peripheral portions thereof to define an enclosed free space, reservoir portion therebetween for receiving said conditioner.

3. An article according to claim 2 wherein said second layer is a form-retaining, polyurethane foam of the open or closed cell type.

4. An article according to claim 1 wherein said first and second layers are adhesively bonded together at their points of contact.

5. An article according to claim 1 impregnated with conditioner selected from solid, semi-solid and/or liquid softeners, antistatic agents, brighteners, bleaching agents, bacteriostate and perfumes.

6. An article according to claim 1 wherein said rubbery polymer material is selected from natural rubber and homo- and interpolymers of mono- and poly-unsaturated hydrocarbon monomers, the polymeric material having the flex and form-retaining properties of soft rubber.

7. An article according to claim 6 wherein said rubbery, polymeric material is a copolymer of styrene and butadiene.

8. An article according to claim 1 wherein said first layer is selected from material and synthetic sponges, foam sheet, paper, cloth, and porous film forming organic polymeric materials, of the form retaining or flexible type.

9. An article according to claim 1 wherein said second layer comprises reticulated sponge.

10. In combination with an internal magnetically attractible surface of a clothes dryer an articles as defined in claim 1.

* * * * *